Figure 1:
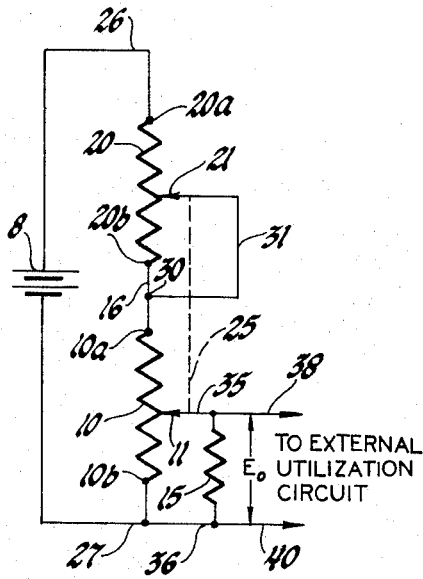

United States Patent
Staker

[15] 3,679,967
[45] July 25, 1972

[54] POTENTIOMETER-RESISTOR NETWORK FOR PRODUCING A NON-LINEAR DIRECT CURRENT POTENTIAL OUTPUT SIGNAL

[72] Inventor: William C. Staker, Springfield, Ohio
[73] Assignee: General Motors Corporation, Detroit, Mich.
[22] Filed: Dec. 21, 1970
[21] Appl. No.: 100,301

[52] U.S. Cl. .................................. 323/79, 323/80, 323/96, 333/81 R, 338/133, 338/120
[51] Int. Cl. .................................................. H02p 13/00
[58] Field of Search ..................... 323/74, 79, 80, 81, 94, 96, 323/8; 318/120, 133; 338/120, 121, 122, 123, 125, 128, 130, 133; 333/81 R

[56] References Cited

UNITED STATES PATENTS

| | | | |
|---|---|---|---|
| 2,854,622 | 9/1958 | Boyle | 323/79 X |
| 3,551,820 | 12/1970 | Bagwell | 323/94 R X |

FOREIGN PATENTS OR APPLICATIONS

| | | | |
|---|---|---|---|
| 151,482 | 1962 | U.S.S.R. | 323/94 R |

OTHER PUBLICATIONS

" Design of Tapped–Potentiometer Function Generators" by V. J. Phillips; Proc. IEE Vol. 114, No. 1, Jan. 1967, pgs. 79–84

Primary Examiner—Gerald Goldberg
Attorney—Eugene W. Christen, Creighton R. Meland and Richard G. Stahr

[57] ABSTRACT

A potentiometer-resistor network for producing a non-linear direct current potential output signal in response to an applied constant direct current potential input signal. A source of constant direct current potential is connected across two series connected linear potentiometers, each having a movable contact mechanically interconnected with the other for ganged operation. The movable contact of one potentiometer is connected to the junction between the two potentiometers and a resistor is connected across the movable contact of the other potentiometer and the terminal end thereof opposite the junction between the series connected potentiometers. Upon the operation of the potentiometer movable contacts, a non-linear direct current output potential signal appears across output circuitry connected across the parallel combination of the resistor and that portion of the potentiometer between the movable contact and the terminal end thereof to which the resistor is connected.

1 Claim, 3 Drawing Figures

PATENTED JUL 25 1972 3,679,967

INVENTOR.
William C. Staker
BY
Richard G. Staker
ATTORNEY

POTENTIOMETER-RESISTOR NETWORK FOR PRODUCING A NON-LINEAR DIRECT CURRENT POTENTIAL OUTPUT SIGNAL

This invention is directed to curve generator networks and, more specifically, to a potentiometer-resistor network for producing a non-linear direct current potential output signal in response to an applied constant direct current potential input signal.

There are commercially available and well known speed control circuits for selectively varying the speed of three phase, alternating current induction motors of the type employing direct current to alternating current inverter circuits having a silicon controlled rectifier bridge. With many of these circuits, the motor speed is changed by varying a direct current control potential applied to a potential controlled oscillator circuit, the output signals of which trigger the silicon controlled rectifiers of the inverter bridge. With speed control circuits of this type, the motor speed increases linearly as the frequency of the potential controlled oscillator increases linearly with control potential.

Speed control circuits of this type are entirely satisfactory with applications which require linear changes of motor speed with changes of motor speed requirements. However, there are many applications which require non-linear changes of motor speed with changes of motor speed requirements. For example, certain grinding operations require a constant grinding wheel surface speed as the diameter of the grinding wheel decreases with wear. With this application, it is necessary that the speed of the grinding wheel driving motor increases substantially hyperbolically as the diameter of the grinding wheel decreases with wear to maintain a constant grinding wheel surface speed.

It is, therefore, an object of this invention to provide an improved circuit for producing a non-linear direct current potential output signal in response to an applied constant direct current potential input signal.

It is another object of this invention to provide an improved potentiometer-resistor network which produces a non-linear direct current potential output signal in response to an applied constant direct current potential input signal.

It is another object of this invention to provide an improved potentiometer-resistor network which, in response to an applied constant direct current potential input signal, will produce a non-linear direct current potential output signal which closely approximates a hyperbola.

In accordance with this invention, a potentiometer-resistor network for producing a non-linear direct current potential output signal is provided wherein a constant direct current potential source is connected across two gang operated series connected linear potentiometers, the movable contact of one of which is connected to the junction therebetween, and a non-linear direct current potential output signal appears across the parallel combination of a resistor connected across the movable contact of the other potentiometer and the terminal end thereof opposite the junction between the potentiometers and that portion of the potentiometer between the movable contact and the terminal end thereof to which the resistor is connected when the movable contacts are operated.

Figure 2:
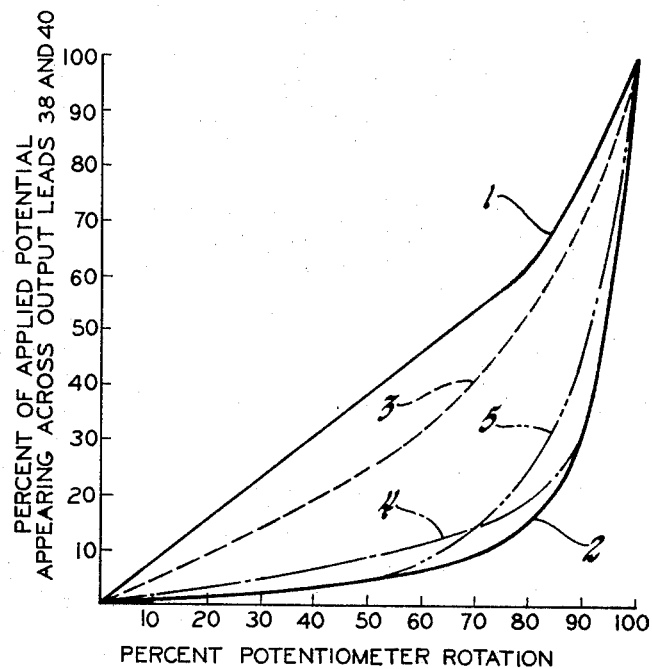
Figure 3:
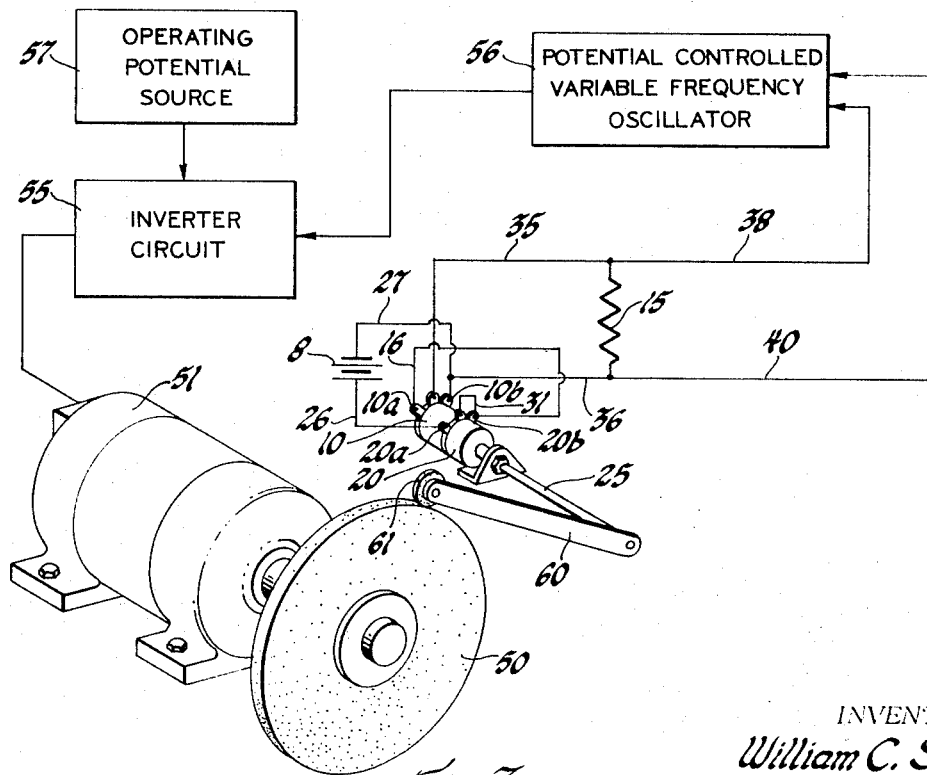

For a better understanding of the present invention, together with additional objects, advantages and features thereof, reference is made to the following description and accompanying drawing in which:

FIG. 1 sets forth the potentiometer-resistor network for producing a non-linear direct current potential output signal in response to an applied constant direct current potential input signal of this invention in schematic form, FIG. 2 is a set of curves useful in understanding the network of FIG. 1, and FIG. 3 is a schematic representation, partially in block form, of a typical application of the network of FIG. 1.

In FIGS. 1 and 3 of the drawing, like elements have been assigned like characters of reference.

Referring to FIG. 1 of the drawing, the potentiometer-resistor network for producing a non-linear direct current potential output signal in response to an applied constant direct current potential input signal of this invention is set forth in schematic form and comprises first and second linear potentiometers 10 and 20 each having a movable contact 11 and 21, respectively, mechanically interconnected with the other for ganged operation and two terminal ends 10a and 10b and 20a and 20b, respectively, and a resistor 15.

Gang operated potentiometers are commercially available items well known in the art which have an operating shaft 25 to which are secured the two movable contacts 11 and 21. Upon the rotation of shaft 25, both movable contacts 11 and 21 rotate therewith in the same direction.

Linear potentiometers 10 and 20 are connected in series through lead 16 which electrically interconnects terminal end 10a of potentiometer 10 and terminal end 20b of potentiometer 20.

A constant direct current potential source is applied across the series connected potentiometers 10 and 20 through input circuit leads 26 and 27 which connect the positive and negative polarity terminals of battery 8 to terminal end 20a of potentiometer 20 and terminal end 10b of potentiometer 10, respectively.

The movable contact of a selected one of the potentiometers is connected to the junction between the series connected potentiometers. Without intention or inference of a limitation thereto, movable contact 21 of potentiometer 20 is connected to junction 30 between series connected potentiometers 10 and 20 through lead 31.

Resistor 15 is connected across the movable contact 11 of the other potentiometer 10 and the terminal end 10b thereof opposite the junction 30 between the series connected potentiometers 10 and 20 through leads 35 and 36. As the movable contacts 11 and 21 of respective linear potentiometers 10 and 20 are operated, a non-linear direct current potential output signal appears across output circuit leads 38 and 40, connected across the parallel combination of resistor 15 and that portion of potentiometer 10 between movable contact 11 and the terminal end thereof to which resistor 15 is connected, which may be applied to external utilization circuitry.

By properly proportioning linear potentiometers 10 and 20 and resistor 15, a non-linear direct current output potential signal closely approximating any given hyperbola, which increases from minimum volts to maximum volts as determined by the potential of direct current potential source 8, may be taken from across output leads 38 and 40 as the movable contacts 11 and 21 of respective linear potentiometers 10 and 20 are operated in a direction from respective terminal ends 10b and 20b toward respective terminal ends 10a and 20a.

Upon the operation of movable contacts 11 and 21 in a direction from respective terminal ends 10b and 20b of respective potentiometers 10 and 20 toward respective terminal ends 10a and 20a, a non-linear direct current potential output signal appears across output circuit leads 38 and 40 which increases from minimum volts to maximum volts as determined by the applied potential of battery 8. In FIG. 2, the percent of applied potential appearing across output circuit leads 38 and 40 versus percent potentiometer shaft 25 rotation is plotted for five different combinations of resistance values of potentiometers 10 and 20 and resistor 15.

With potentiometer 10 and resistor 15 of an equal ohmic value which is ten times greater than the ohmic value of potentiometer 20, the output signal increases linearly until approximately 80 percent of potentiometer shaft 25 rotation, at which point it increases sharply to maximum, as shown by curve 1.

With potentiometer 10 and resistor 15 of an equal ohmic value and potentiometer 20 of a ten times greater ohmic value, the output signal increases very slowly until approximately 70 percent potentiometer shaft 25 rotation, increases more rapidly until approximately 90 percent potentiometer shaft 25 rotation at which point it increases sharply to maximum, as shown by curve 2.

With potentiometers 10 and 20 and resistor 15 all of an equal ohmic value, the output signal curves smoothly from zero to maximum, as shown in curve 3.

With potentiometers 10 and 20 of an equal ohmic value which is ten times greater than the ohmic value of resistor 15, the output signal increases more rapidly at the low percentage settings of potentiometer shaft 25 rotation, as compared to the output signal of curve 2, until approximately 90 percent, at which time it increases along curve 2 to maximum, as shown in curve 4.

With potentiometer 20 and resistor 15 of an equal ohmic value which is ten times greater than the ohmic value of potentiometer 10, the output signal increases along curve 2 at potentiometer shaft 25 rotation between 0 percent and 50 percent, increases more rapidly until 90 percent and then increases sharply to maximum, as shown in curve 5.

From this it may be seen that by properly proportioning the ohmic values of potentiometers 10 and 20 and resistor 15, an output potential signal closely approximating any given hyperbola may be produced by the potentiometer-resistor network of this invention with a constant applied direct current potential input signal.

A practical application of the potentiometer-resistor network of this invention was with a grinding operation which required the grinding wheel surface speed to be constant as the diameter decreased with wear. Grinding wheel 50 was driven by a three phase, alternating current induction motor 51. To vary the speed of motor 51, a well known inverter circuit arrangement of the type having a silicon controlled rectifier bridge triggered by the output signals of a potential controlled variable frequency oscillator was employed. As inverter circuits and potential controlled variable frequency oscillator circuits of this type are well known in the art and, per se, form no part of this invention, each has been shown in block form in FIG. 3 and referenced by the numerals 55 and 56, respectively. The inverter circuit 55 applies the operating potential of operating potential source 57, also shown in block form, to motor 51 at a frequency determined by the frequency of oscillator 56.

The shaft 25 of gang operated, linear potentiometers 10 and 20 is rotated by arm 60, to which it is secured, which rotates in a counter-clockwise direction to move movable contacts 11 and 21 from respective terminal ends 10$b$ and 20$b$ of respective potentiometers 10 and 20 toward terminal ends 10$a$ and 20$a$, as roller member 61, which engages the surface of grinding wheel 50, follows the surface of grinding wheel 51 as the diameter decreases with wear. As the resistance values of potentiometers 10 and 20 and resistor 10 were so proportioned to produce an output signal which closely approximated the hyperbolic relation between grinding wheel diameter and surface speed, oscillator 56 increases to speed of motor 51, through inverter circuit 55, substantially hyperbalically to maintain a constant grinding wheel surface speed. The resistance values of potentiometers 10 and 20 and resistor 15 in this application were one kilohm, 25 kilohms and 120 ohms, respectively.

It is to be specifically understood that other arrangements for sensing grinding wheel diameter and rotating potentiometer shaft proportional thereto may be employed without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

It is claimed:

1. A Potentiometer-resistor network for producing a non-linear direct current potential output signal in response to an applied constant direct current potential input signal comprising, first and second linear potentiometers each having a movable contact mechanically interconnected with the other for ganged operation and two terminal ends, means for connecting said potentiometers in series, means for applying a constant direct current potential source across said series connected potentiometers, means for connecting said movable contact of a selected one f said potentiometers to the junction between said series connected potentiometers, a resistor, means for connecting said resistor across said movable contact of the other one of said potentiometers and the said terminal end thereof opposite the junction between said series connected potentiometers and output circuitry across which appears a non-linear direct current potential output signal when said movable contacts of said potentiometers are operated.

* * * * *